United States Patent [19]

Brockington

[11] Patent Number: 5,070,641
[45] Date of Patent: Dec. 10, 1991

[54] CROP PROTECTION TAPE

[75] Inventor: F. Rhett Brockington, Columbia, S.C.

[73] Assignee: Anchor Continental, Inc., Columbia, S.C.

[21] Appl. No.: 438,990

[22] Filed: Nov. 20, 1989

Related U.S. Application Data

[63] Continuation of Ser. No. 159,304, Feb. 19, 1988, abandoned.

[51] Int. Cl.⁵ ............................................. A01G 7/00
[52] U.S. Cl. ............................................ 47/9; 47/54
[58] Field of Search ................... 47/9, 26, 27, 32, 56, 47/28 R, 5.5, 54

[56] References Cited

U.S. PATENT DOCUMENTS

| | | | |
|---|---|---|---|
| 1,930,939 | 10/1933 | Horner | 47/9 |
| 2,571,491 | 10/1951 | Schindler | 47/56 |
| 2,740,233 | 4/1956 | Reynolds | 47/9 |
| 3,180,290 | 4/1965 | Kappelmann et al. | 47/9 |
| 3,559,599 | 2/1971 | Hoadley | 47/9 |
| 3,580,196 | 5/1971 | Lofgreen | 47/9 |
| 3,805,446 | 4/1974 | Aoyagi | 47/9 |
| 3,810,328 | 5/1974 | Brayan et al. | 47/9 |
| 3,872,621 | 3/1975 | Greenbaum | 47/59 |
| 3,975,859 | 8/1976 | Müller | 47/9 |
| 4,092,936 | 6/1978 | Griffin et al. | 47/9 |
| 4,286,408 | 9/1981 | Manno | 47/9 |
| 4,291,499 | 9/1981 | Prewer | 47/1 R |
| 4,782,626 | 11/1988 | Shanley et al. | 47/9 |

FOREIGN PATENT DOCUMENTS 2505607  11/1982  France ..................... 47/9

Primary Examiner—Robert A. Hafer
Assistant Examiner—Charles H. Sam
Attorney, Agent, or Firm—Bradford E. Kile; Ruffin B. Cordell

[57] ABSTRACT

A flexible, continuous web of a protective foldable tape with borders of pressure sensitive adhesive on each of its longitudinal edges for automated securing of the tape to a pre-installed mulch system. The tape is wound about a core forming a cylindrical roll. In application, the protective tape is adhered to the mulch bed as it unwinds from a spindle centered above the bed by pressing the adhesive zones against the mulch covering the bed. The spindle is mounted on farm equipment capable of tracking the bed path. The equipment can be self-propelled or pulled by a tractor. Prior to dispensing the tape, the bed can be fitted with support devices such as hoops, stakes or wire.

2 Claims, 2 Drawing Sheets

CROP PROTECTION TAPE

This application is a continuation of application Ser. No. 07/159,304, filed Feb. 19, 1988, now abandoned.

BACKGROUND AND FIELD OF THE INVENTION

Modern, high density farming frequently employs the use of a plastic film mulch, such as polyethylene, as a covering or partial covering for fumigated beds. The mulch retains moisture and controls weed growth. Much of this farming is done in warm climates. In many of these climates, multiple plantings are feasible except for a few rare days of frost or freezing temperatures. However, when frost does occur it is devastating. Entire crops can be lost. To the farmer this can result in losses in excess of thousands of dollars per acre. There is a tremendous need for a cost effective method of protecting winter crops during these infrequent cold spells.

There are several prior art techniques used to minimize damage. One of the more popular methods is to water the crop continuously with overhead sprinklers. This method works at freezing temperatures except when the cold is accompanied by wind. The wind redirects the distribution of water allowing sections of the crop to go unprotected. Increasingly, farmers are using trickle irrigation to conserve water and in that case no sprinkler system is available. Smudge pots are another protective measure. They produce a heavy smog which can keep the area warm in the absence of wind.

A still newer method is the use of water containing fertilizer salts which, when absorbed by the plants, act as a freezing point depressant. This method is expensive and controversial. Even more controversial is the use of man-made bacteria which contribute to frost protection.

One of the most effective methods of protecting the plants is to cover them with a film such as clear polyethylene, However, daylight temperatures under such film can reach temperatures that cause the plant to die, or in some respects worse, live but produce low crop yields.

In order for any protective method to be commercially effective it must be adaptable to automation. Typically, frost warnings are forecast a maximum of 48 hours in advance. Unless the protective method is automated, there is insufficient time to protect the fields. In many instances, strong winds accompany severe weather changes. The wind can be nearly as injurious as the frost. The protective method must therefore also be immune to those winds.

If a protective covering is used, it must have the capability to remain on the bed 5-10 days. The covering must be able to withstand weather for that period, and the environment under the covering must be conducive to maintaining the plant's subsistence. It is unlikely that a single type of covering will be applicable to all plants. The criteria varies even within the same species. For instance, spun bonded nonwovens have been tested as a covering for strawberries. It was found that strawberries which have most of their blooms on top of the plant yielded deformed berries. This is believed to have been due to the abrasive action of the covering rubbing against the buds. Another variety of strawberries having most of its blooms on the bottom of the plant had a lower percentage of deformed berries. Also, the covering must be economical enough that the incremental increase in cost is justified.

BRIEF DESCRIPTION AND OBJECTIVES OF THE INVENTION

This invention relates to a covering tape which can be quickly and readily adhered to a previously installed plastic mulch.

A principal object of this invention is to provide a covering tape which is quickly and efficiently dispersed from a moving vehicle and has means by which it can adhere to a mulch that has been previously disposed around a row of seedlings.

A further object of this invention is to provide a tape of a type having the aforementioned advantages and is resistant to wear and tear at cold temperatures and will resist aging for a sufficient time, under adverse climate conditions, to accomplish its objectives.

A further object of this invention is to provide a covering tape that can be secured to a mulch which is adapted to be wound about a core but which can be formed to provide an elongated housing over a line of plants.

Another object of the invention is to provide a covering that can be prepared off-line and is formed with adhesive edges which are readily usable for securing to a previously installed mulch construction.

These and other objectives and advantages will become apparent from the following description in conjunction with the accompanying drawings.

DETAILED DESCRIPTION OF THE DRAWINGS

Figure 1:
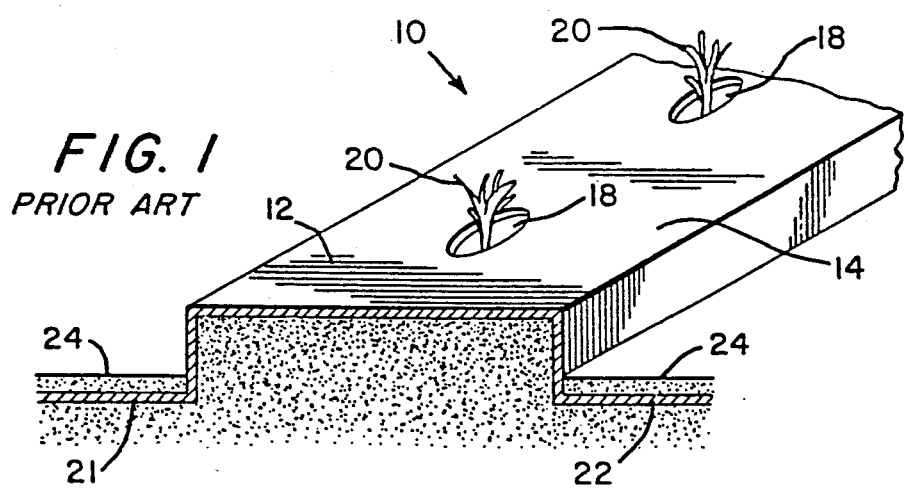
FIG. 1 is a diagrammatic perspective of a common prior art plastic mulch device.

Referring now to the drawings wherein like numerals indicate like parts, the numeral 10 is representative of a typical polyethylene elongated mulch system having surfaces 12 and 14 comprising a top 16. The top 16 has openings 18 spaced along its longitudinal length, each of which is disposed over a seedling 20. The system 10 is oftentimes formed with outwardly flaring extensions 20 and 22 that are adapted to receive a shallow layer of soil 24 thereover for positioning the mulch. Stakes 25, shown in FIG. 2, can also be used. The mulch system 10 is representative of a number of systems but, for purposes of this invention, the mulch system should have structures the equivalent of surfaces 12 and 14 to which a tape 26 can be secured.

Figure 2:
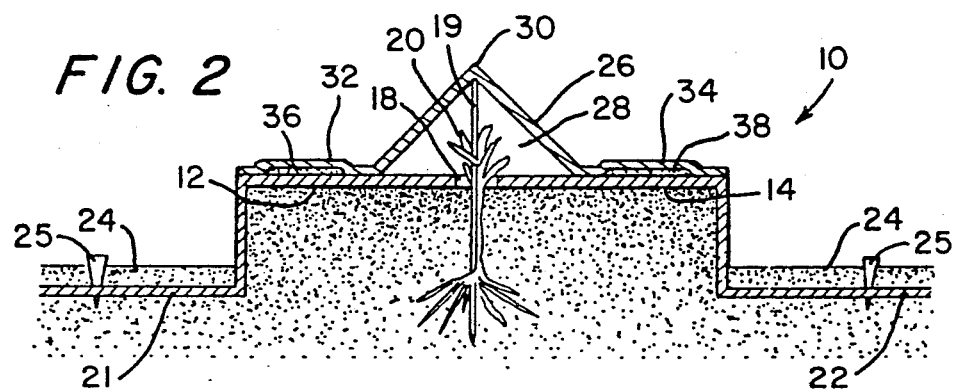
FIG. 2 is a lateral cross-section of FIG. 1 showing the tape of this invention secured to the mulch of FIG. 1.

As seen best in FIG. 2, a covering tape is formed of a flexible continuous web of protective material 26 and is disposed over the system 10 to provide a tunnel-like cavity 28 to receive the upper ends of seedlings 20. The web 26 is creased at 30 and has outwardly extending edges 32 and 34 which are formed with adhesive layers 36 and 38 to secure the web to surfaces 12 and 14.

Unrolling equipment to support the roll 50 and for creasing the roll at 30 is available. A creasing device (not shown) may take the form of a triangular member used in conjunction with rollers to crease the flexible web to form cavity 28. The continuous web is either self supportive or may be supported over the plants by stakes 19 to ensure that cavity 28 creases and does not collapse. As continuous web 26 is unrolled, spring-urged rollers 42 and 44 are provided to exert pressure to edges 32 and 34 so as to urge the adhesive layers 36 and 38 against the surface areas 12 and 14 of mulch system 10. As diagrammatically shown in FIG. 3, these rollers press against the mulch. The creasing system is carried by a dispensing system and forms the crease 30 as the web 26 is unrolled.

As previously mentioned, the mulch 10 is a commonly used mulching device for growing efficiency. In the event of harsh weather, it is necessary for the grower to be able to quickly and inexpensively cover the plants for several days.

Figure 3:
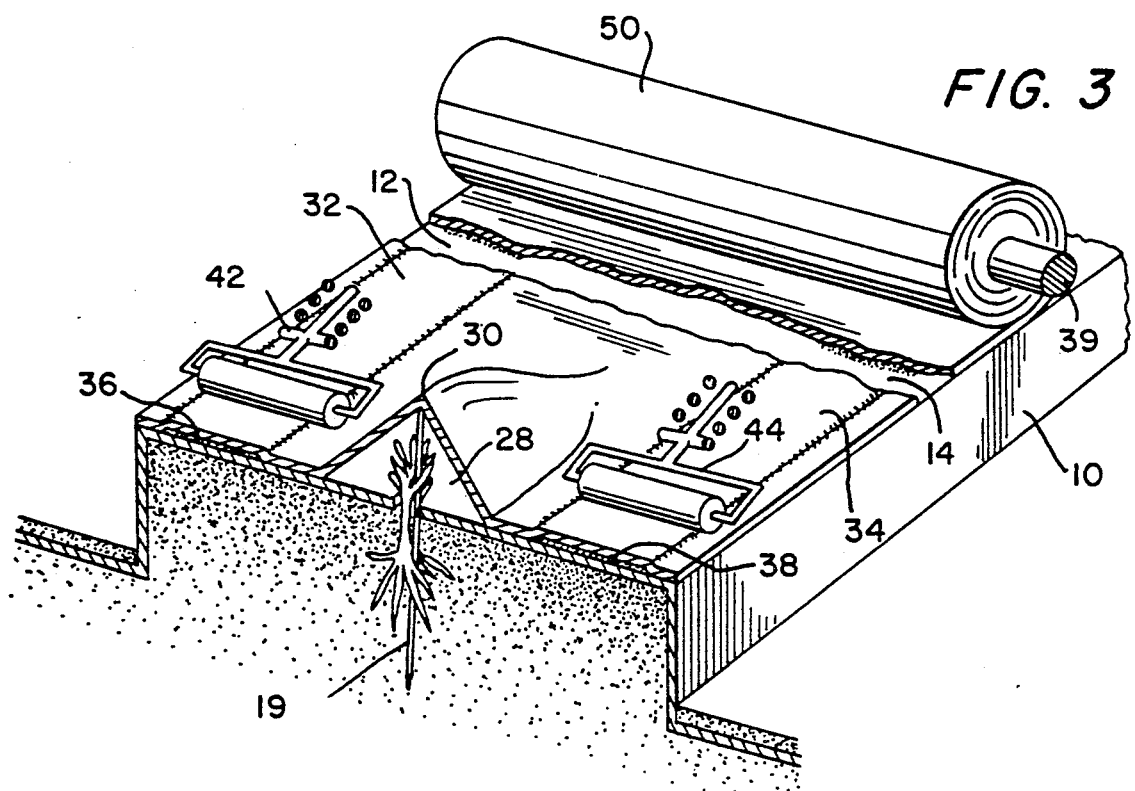
FIG. 3 is a diagrammatic view that discloses the manner by which the protective web of this invention is creased end secured to the mulching device.
Figure 4:
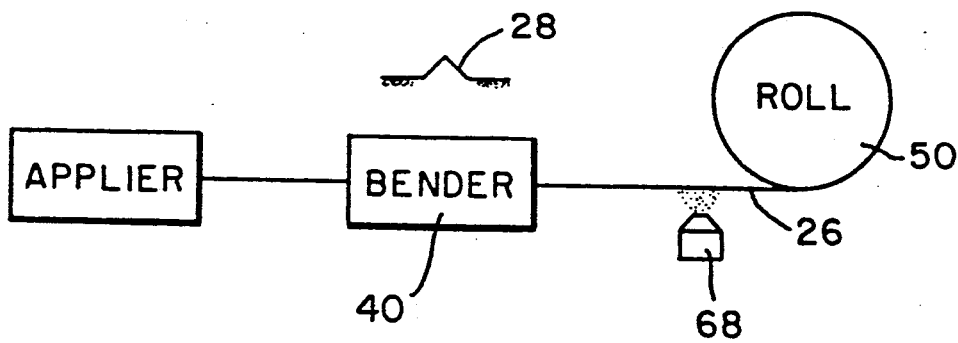
FIG. 4 is a diagrammatic flow diagram with the bent tape shown as it would appear transverse to the movement of the tape.

In such instances, a roll of paper such as that diagrammatically shown in FIG. 3 and depicted by the numeral 50 is mounted on a vehicle. As the roll 50 is wound, its web 26 is subjected to a bender system 40, diagrammatically shown in FIG. 4, which deforms the web to form the cavity 28 to cover the seedlings 20. The web 26 is adhesively secured to the walls 12 and 14 of the original mulching device. As shown in FIGS. 1-3, the web 26 is a type that will maintain its shape after being subjected to the bending apparatus or will be sufficiently light to be supported by the plants underneath. Alternatively, stakes 19 may be provided to ensure proper and support. The beds may also be fitted with wire or tensioned stake strings to provide further support. It has been found in practice that a 50# brown kraft paper containing wet strength additives is suitable for this purpose. Such products have good resistance to weather and are sufficiently inexpensive that they can be used in an agricultural environment and are readily removed from the mulch when desired.

The covering tape may be formed in a number of ways as discussed below. It may advantageously be formed of a wide covering web bordered by narrow strips of splicing tape.

Figure 5:
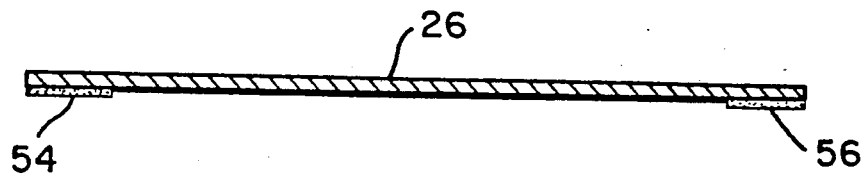
FIG. 5 is a lateral cross-section showing one embodiment of tape utilized with this invention.

In a preferred embodiment, there is used a web 26 that has adhesive layers 54 and 56 on its lateral edges. The adhesive layers may take several forms advantageously. In FIG. 5, the adhesive layers are of a type that will adhere to the mulch but not to the upper surface of tape 26. This permits the tape to be rolled but yet adheres to the mulch. Common household pressure sensitive tapes are examples of this genre.

Figure 6:
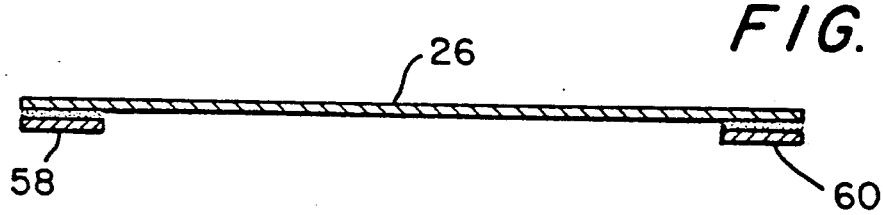
FIG. 6 is a second embodiment of a type of tape.

The embodiment of FIG. 6 discloses a system wherein the adhesive layers are covered with strips 58 and 60. Strips 58 and 60 are removed to expose the adhesive just after the web departs from roll 50.

Figure 7:
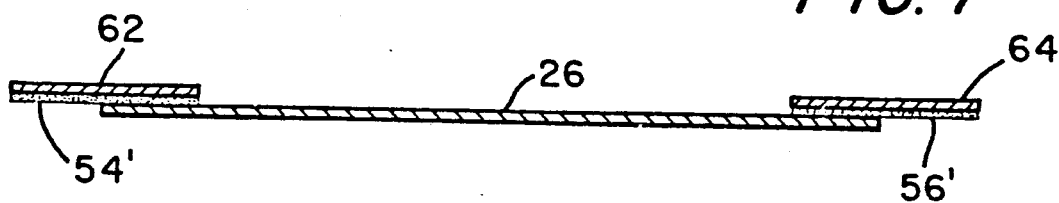
FIG. 7 is a third embodiment of a type of tape.

In FIG. 7, there is shown a system wherein strips 62 and 64 are applied to web 26. In this embodiment, the adhesive layers 54' and 56' are of a type that will adhere to the web 26 and the mulch. An overlap is provided so that the web can be secured to the mulch. The strips 62 and 64 are secured to the web *after* it is unwound.

Figure 8:
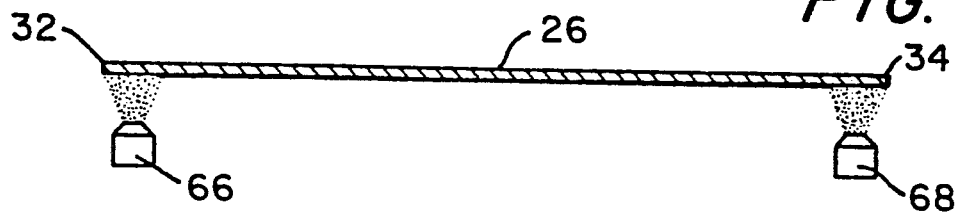
FIG. 8 is a fourth embodiment of a type of tape.

Another form of the invention is shown in FIG. 8. Here, adhesive dispensers diagrammatically indicated by the numerals 66 and 68 are located near roll 50 to apply adhesive to the edges 32 and 34 of web 26 as it leaves roll 50.

In certain applications, particularly those in which nonwoven webs are utilized, zone coating may be the preferred construction. Exposure to the adhesive can be lessened by wrapping the roll of protective tape with a shrink wrap. To prevent the coated edges from crimping during shipment, a core 39 is used which projects beyond the edge of the splicing tape. The shrink wrap covers the tape to the core. If web 26 is relatively thin (less than 7 mils) it has some inherent elongation. During the lamination process, the web can be stretched so that the splicing tape layers make contact intermittently. Whatever the choice of construction, the adhesive itself should have workable tacks at 25°-30° F. or lower.

To facilitate the removal of protective tape 26 from the mulch, a rip string (not shown) is incorporated into the construction. The rip string will allow the web to be torn away from the adhesive border at the point of interface. For instance in the FIG. 5 construction, a string is laminated with the splicing tape at a point just outside the edge of the web.

To facilitate a better understanding of the invention, several examples are provided.

EXAMPLE 1

Tomatoes can be grown in some climates the entire year. A typical bed is 36" wide, 6" high and 1100 feet long. The beds are covered with a mulch of black, embossed 75-gauge polyethylene. Between mid-December until mid-February in the Northern Hemisphere, plants 4" to 12" high are susceptible to frost damage. Although temperatures are freezing at night, the temperature in the fields in the daytime can reach 70° F. and consequently clear film is oftentimes unacceptable.

It has been found that a 50#, extensible brown kraft paper containing wet strength additives laminated with a 40# extensible brown, saturated kraft paper splicing tape in the manner shown on FIG. 5 will protect the tomatoes against frost. The protective tape was on the bed for 10 days. In several of these days, the temperatures exceeded 70° F. When the tape was removed there was no apparent damage to the plants due to either heat, cold or lack of light. The beds were watered using drip irrigation. During this 10-day period, approximately ¼" rain fell with no apparent gross deterioration of the paper. After becoming wet, the covering tape did tend to conform to the morphology of the plant more closely.

The optimum width of the protective tape was determined to be 34". This width was prepared by laminating a 30" web with two 4" wide lengths of splicing tape, such that each length has 2" of adhesive laminated to the web and 2" available for splicing to the bed. The adhesive chosen for the splicing tape was a styrene isoprene block copolymer blended with a natural rubber. Finger tack was good at 32° F. and shear was sufficient to tear the polyethylene. The release coat had a backing release of 9-11 oz/in. The 40 kraft had good tensile properties, 30#/in, and fair tear resistance. The tape was wound on a 40" long core. The protective tape was applied using a pulled rig that straddled the bed and was equipped with a set of horizontally mounted guide wheels that tracked the path of the bed. A tracking mechanism was used to center the tape above the plants. As the tape was unwound, it was creased in the center over a combination of rollers and pinch points that shaped the tape into an inverted "V" with flared segments. (See FIG. 3) The adhesive edges of the tape were pressed against the bed with a pair of floating rollers. The rig was capable of carrying two or more rolls of web and the end of the unwound roll was spliced to the beginning of the new roll of web so as to form or a continuous length of tape.

EXAMPLE 2

Strawberry farmers use a higher and narrower bed than do tomato growers. Each bed contains two rows of plants which tend to sprawl. The typical plant to be protected is 4–10" and a wider tape is required. Approximately 46" is suitable. The web is adhered to the sides of the bed. Strawberry buds are easily damaged by an abrasive action of a rough surface. Also strawberries are often grown in slightly cooler climates than tomatoes, and therefore increased insulation is desired. Therefore, a 46" wide protective tape was formed by laminating a web of 78# cardboard facing stock (42" wide) to a 40# kraft splicing tape (4" wide). The splicing tape was coated with a cold temperature adhesive. A rip string was incorporated to permit easy removal of the tape without damaging the polyethylene mulch. The protective tape was supported by a tensioned stake string which ran longitudinally the center of the bed. The support string was 12" above the bed.

EXAMPLE 3

A self-supporting protective covering is formed over the film covered beds using a web that is rigid in the cross direction and flexible in the machine direction such as a singlefaced corrugated cardboard. Using the construction of FIG. 6, a 56" web of single-faced cardboard was laminated to a 4" wide splicing tape on its facing side and 2½" splicing tape on the corrugated side so that 2⅞" of adhesive was available on each edge for adherence to the film. The cardboard was crimped in the longitudinal center into an inverted "V" with flared sections as applied.

EXAMPLE 4

Using a modified version of Example 3, a semi-permanent greenhouse can be fabricated, where one-half of the corrugated cardboard is replaced with a transparent corrugated plastic. The two sections are jointed together at the longitudinal center forming a web, one side of which is paper and the other side of which is plastic. This web is laminated with splicing tapes. In the inverted "V" position on the bed the corrugated cardboard serves as an insulator and the transparent plastic acts as a window.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

What is claimed is:

1. A method for selectively covering a row of plants that have been previously provided with a mulching layer comprising:
    feeding an elongated web material from a roll;
    applying adhesive to the bottom edges of said web material;
    placing said web material over said mulching layer in parallel alignment;
    applying force to the upper edges of said web material to form an adhesive bond between said bottom edges of said web material and said mulching layer.

2. The method of claim 1 further comprising the step of creasing said web material to form a tenting in said web material prior to placing said web over said mulching layer in parallel alignment.

* * * * *